A. J. COLLAR.
FLOOD AND FEED GATE.
APPLICATION FILED NOV. 13, 1909.
973,106.
Patented Oct. 18, 1910.
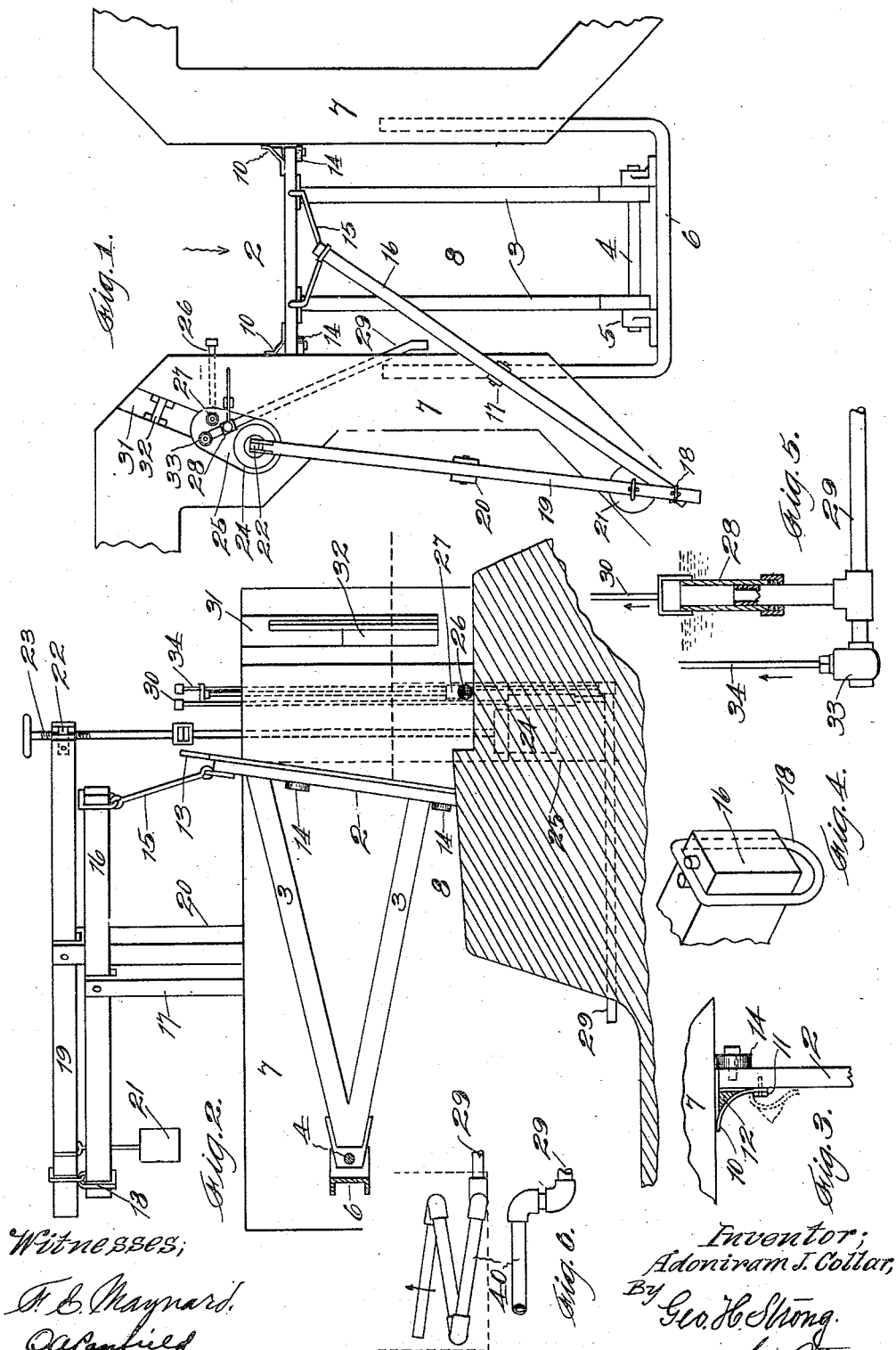

UNITED STATES PATENT OFFICE.

ADONIRAM J. COLLAR, OF YREKA, CALIFORNIA.

FLOOD AND FEED GATE.

973,106.  Specification of Letters Patent.  Patented Oct. 18, 1910.

Application filed November 13, 1909. Serial No. 527,815.

*To all whom it may concern:*

Be it known that I, ADONIRAM J. COLLAR, a citizen of the United States, residing at Yreka, in the county of Siskiyou and State of California, have invented new and useful Improvements in Flood and Feed Gates, of which the following is a specification.

This invention pertains to ditch gates, and especially to flood and feed gates.

It is an object of this invention to provide a simple, reliable, durable gate, thoroughly adapted to automatically control water flowing from a main ditch into a race or canal under normal conditions, and an important purpose is to provide a gate which, in construction and operation, is well able to withstand abnormal strains and uses when subjected to flood, and which will automatically operate to relieve flood waters from the main ditch or canal.

The invention consists of the parts and the combination and construction of parts as hereinafter more fully described and claimed, having reference to the accompanying drawings, in which—

Figure 1 is a plan. Fig. 2 is a central longitudinal section. Fig. 3 is a detail of the packing strip. Fig. 4 is a perspective of a loop. Fig. 5 is a detail of the trap and drain valve. Fig. 6 is a modified form of a drain valve.

As shown the invention comprises a gate 2, constructed of any suitable material, shape and size, though preferably it is made flat and rectangular, and is firmly secured upon the outer ends of radius rods 3, which are converged and mounted upon a pivot 4. The pivot 4 is journaled in suitable bearings 5 fastened upon a cross-bar 6, suitably secured or embedded in the sides or walls 7 of the flume 8 across which the gate 2 extends, and in which flume the gate is vertically adjustable. When the gate is lowered and subjected to pressure, water is prevented from escaping at the edges of the gate by means of flexible packing-strips 10 which extend along the vertical edges of the gate, and are secured thereto by suitable devices as a cleat, screws or nails 11. To the rear of these packing strips are triangular stays 12 having concave faces to which the strips 10 are attached, and in practice these stays extend up sufficiently to afford grips or handles 13 enabling the strips 10 to be turned away from the flume walls 7.

By hanging the gate so that its face inclines slightly toward the main canal or feed end of the flume and mounting the pivot 4 above the high water level I am able to provide a gate which requires a minimum exertion of energy to open and cannot "stick", and to further insure against excessive side friction and jamming, the gate is provided upon its rear face and contiguous to the edges, with rollers 14.

In order to operate and adjust the gate 2 in the flume 8, a bail 15 connects the gate to a strong lever 16 fulcrumed upon a post 17, and flexibly connected by yokes 18 to another lever 19. This lever 19 is fulcrumed upon a post 20, and is provided with an adjustable weight 21 of such degree that it nearly balances the gate 2. The opposite end of lever 19 is provided with a movable nut 22 through which is turnable a screw 23, whereby a float 24 is sustained and may be adjusted relative to the end of lever 19. The float 24 is suspended in a man-hole or well 25, of such depth as will give full scope of operations between the canal and flume. Communicating with the well 25, near its bottom and extending out to the canal, is a supply pipe 26 having a valve 27 which may be opened to allow sufficient water into the well as will raise the float 24 which, through the instrumentality of the connections 18 and 15 of the levers 19—16 to gate 2, will lift the gate a distance predetermined by the adjusting screw 23, and an adjustable trap 28 of a drain 29, in the well bottom, leading to the lower flume 8.

The operation of the gate is then as follows: With normal head water in the canal, and the gate 2 down or closed, and the float 24 adjusted to correspond, if a given volume is required in flume 8, the trap 28 is regulated by stem 30, in height to determine the quantity of water necessary in the well 25, to lift the float 24 and simultaneously the gate 2. By opening valve 27 water flows through pipe 26 into the well and will raise the float 24. When the water level in the well reaches the top of overflow trap 28, the water level then remains constant and float 24 will rise no higher. At this time the valve 27 is closed and the float 24, now buoyant, holds the gate 2 open beneath which water from the canal constantly flows into the flume 8.

A very important feature of the invention is the provision of automatic means whereby flood waters of the canal are allowed to pass the gate without destructive effect, and by which the flood waters are drawn from the canal and used to advantage, decreasing the usual danger of inundation of contiguous property.

To accomplish the automatic opening of the gate 2, an open conduit 31 connects the canal with the well 25, and under normal conditions no water will flow through the conduit which may be provided with any suitable gate or structure 32 adjustable to a height which is such that when the water in the canal rises from any cause it will pass over the gate 32 and traverse the conduit 31, discharging into the well 25. The accumulating water unable to be entirely conducted out at trap 28, will raise the float 24, and by means of the levers 16—19 the gate 2 will be proportionately opened thus relieving the water in the canal. It is readily conceivable that with a number of these relief gates located along a canal, its waters would be under perfect control at all times, and that the gate would operate continuously without the attention of an operator. After flood waters have subsided, the surplus in the well 25 will gradually be discharged by drain 29 and trap 28 until it has again assumed a level equal to the top of trap 28. This will lower the float 24, and its coacting gate 2 to the position predetermined by the level of trap 28.

If necessary to repair or clean the well 24, it may be drained by pipe 29, by opening a valve 33, in the end thereof, an operating handle or rod 34 projecting up the well convenient to the operator.

In order to allow the necessary movement of each lever 16—19 and yet prevent undue lost motion, the yokes 18, Fig. 4, are shown slipped over the ends of the levers, and spiked on each side where they bear upon the lever. This prevents slipping of the yoke 18, and still allows it to swing a sufficient amount.

Fig. 6 shows an adjustable trap consisting of jointed sections 40, the outer end being open in the bottom of the well 25. By reason of the flexible end joints, the upper discharge end may be raised to any desired height, and control the level of the water in the trap.

It will be understood that while a branch canal or flume has been heretofore described, the flow in the main canal may be controlled by the apparatus herein described, where no branch but a continuation of the canal is used.

Having thus described my invention, what I claim and desire to secure by Letters Patent is—

1. The combination with a ditch or canal, of an intermediate rising and falling gate, a counterbalanced fulcrumed lever having one end connected with the gate, a second lever connected with the outer end of the first lever, a float connected with the outer end of the second lever, a well between the walls of which the float operates, and means to admit water from the canal to the well to lift the float and open the gate.

2. The combination with a main canal, and a branch thereof of an intermediate rising and falling gate, a pair of levers having their meeting ends connected and counterbalanced, the opposite end of one lever connected with the gate, and of the other to a float, a containing well for the float, and a controlled inlet from the canal to the well.

3. The combination with a main canal and a branch thereof, of an intermediate rising and falling gate, a pair of levers having their meeting ends connected and counterbalanced, the opposite end of one lever connected with the gate and of the other to a float, a containing well for the float, an inlet passage from the canal, and a valve to admit water to the well, to act through the float and levers to open the main gate.

4. The combination with a main canal and a branch thereof, of an intermediate rising and falling gate, a pair of levers having their meeting ends connected and counterbalanced, the opposite end of one lever connected with the gate and of the other to a float, a containing well for the float, an inlet passage from the canal, a valve to admit water to the well to act through the float, and levers to open the main gate, and an adjusting connection between the float and its connected lever.

5. The combination with a main canal and continuation, of an intermediate rising and falling gate, a pair of levers having their meeting ends connected and counterbalanced, the opposite end of one lever connected with the gate and of the other to a float, a containing well for the float, an inlet passage from the canal, a valve to admit water to the well to act through the float, and levers to open the main gate, and a passage from the well to the continuation to maintain the level in the well.

6. The combination with a main canal and a branch thereof, of an intermediate rising and falling gate, a pair of levers having their meeting ends connected and counterbalanced, the opposite end of one lever connected with the gate and of the other to a float, a containing well for the float, an inlet passage from the canal, a valve to admit water to the well to act through the float, and levers to open the main gate, a passage from the well to the branch to maintain the level in the well, and a supplemental passage of larger area from the main canal to the well, to supply water faster than it can escape, and raise the float and gate to allow the surplus in the main canal to escape.

7. The combination with a canal, of a rising and falling gate, a pair of levers with meeting and counterbalanced outer ends, one lever having its opposite end connected with the gate, and the other lever to a float, a containing well for the float, an inlet passage from the canal to the well, and an adjustable outlet passage from the well to determine the depth of water in the well and the relative opening of the gate.

In testimony whereof I have hereunto set my hand in the presence of two subscribing witnesses.

ADONIRAM J. COLLAR.

Witnesses:
R. S. BERRY,
W. R. DAVIS.